United States Patent [19]
Maruyama

[11] Patent Number: 6,075,951
[45] Date of Patent: Jun. 13, 2000

[54] SILVER SALT FILM/ELECTRONIC STILL CAMERA

[75] Inventor: Atsushi Maruyama, Sagamihara, Japan

[73] Assignee: Olympus Optical Co., Ltd., Tokyo, Japan

[21] Appl. No.: 09/250,182

[22] Filed: Feb. 16, 1999

[30] Foreign Application Priority Data

Feb. 17, 1998 [JP] Japan .................................. 10-034463

[51] Int. Cl.$^7$ .................................................. G03B 17/48
[52] U.S. Cl. ........................................... 396/429; 396/374
[58] Field of Search ..................................... 396/374, 429

[56] References Cited

U.S. PATENT DOCUMENTS

| 5,546,121 | 8/1996 | Gotanda et al. | 396/429 |
|---|---|---|---|
| 5,710,954 | 1/1998 | Inoue . | |
| 5,737,062 | 4/1998 | Yoshikawa . | |
| 5,774,750 | 6/1998 | Honda . | |
| 5,774,754 | 6/1998 | Ootsuka . | |
| 5,822,625 | 10/1998 | Leidig et al. | 396/429 |
| 5,845,166 | 12/1998 | Fellegara et al. | 396/429 |
| 5,950,031 | 9/1999 | Yamagata | 396/429 |

FOREIGN PATENT DOCUMENTS

| 1-114169 | 5/1989 | Japan . |
|---|---|---|
| 5-113599 | 5/1993 | Japan . |
| 5-134312 | 5/1993 | Japan . |
| 5-188474 | 7/1993 | Japan . |

*Primary Examiner*—Russell Adams
*Attorney, Agent, or Firm*—Pillsbury Madison & Sutro LLP

[57] ABSTRACT

A camera for both silver-salt film photographing and electronic still photographing, which includes an electronic still photographing unit having an imaging device for converting an object image to an electronic signal, a monitor display which displays the object image based on the electronic signal outputted from the electronic still photographing unit by utilizing ambient light thereof; and a silver-salt film photographing unit which exposes the object image on a silver-salt film, wherein the electronic still photographing unit and the silver-salt film photographing unit have a common timing for beginning photographic exposures.

18 Claims, 11 Drawing Sheets

SILVER SALT FILM/ELECTRONIC STILL CAMERA

This application claims priority from application No. Hei 10-34463 filed in Japan on Feb. 17, 1998, the contents of which are hereby incorporated by reference.

BACKGROUND OF THE INVENTION

1. Field of the Invention

The present invention relates to a camera for both silver salt film photography and electronic still photography, the camera having both an apparatus for exposing an image of an object on a silver salt film and an apparatus including an imaging device for converting the image of the object into an electronic signal.

2. Description of Related Art

Up to the present time, there has been proposed cameras for both silver salt film photography and electronic still photography. For example, Japanese Laid-Open Patent Application No. 1-114169 discloses an art which enables a single lens reflex camera having a function for immediately confirming a photographed image on the silver salt film by displaying an image of an object on a monitor device, the image displayed having been imaged by an imager device receiving a part of incident rays from the object caused by a mirror moving in synchronism with a shutter device of the camera.

Since those cameras for both silver salt film photography and electronic still photography as described above generally include more electronic drivers than usual cameras for silver salt film, those cameras have as a major problem the reduction in power consumption to save battery life. For instance, in order to reduce an interval of time between photographic operations, those cameras generally activate operations for both feeding film and displaying monitor at a time after each film exposure. Thus, reducing power consumption in the monitor device is effective enough for such a problem. However, the above described Patent Application No. 1-114169 gives no suggestions for reducing power consumption of the monitor device.

On the other hand, a monitor device including the combination of a permeation type LCD (Liquid Crystal Display) panel and a back light, which is commonly used in a video camera and a digital camera, hardly facilitates displaying images at a place where the intensity of ambient light is sufficient. This problem generally comes from the fact that the intensity of the back light is less than the ambient light level. To solve this problem, the intensity of the back light can be increased; however, the power consumption due to the back light will increase.

SUMMARY OF THE INVENTION

The first object of the present invention is to provide a camera for both silver salt film photography and electronic still photography where the camera prevents increasing power consumption.

The second object of the present invention is to provide a camera which facilitates displaying an image regardless of ambient light level.

In order to solve above mentioned problem, a camera for both silver salt film photography and electronic still photography includes an electronic still photographing unit including an imaging device for converting an object image to an electronic signal, a monitor display which displays the object image based on the electronic signal outputted from the electronic still photographing unit by utilizing ambient light thereof, and a silver-salt film photographing unit which exposes the object image on a silver-salt film, wherein the electronic still photographing unit and the silver-salt film photographing unit have a common timing for beginning photographic exposures.

According to the present invention, a camera for both silver salt film photography and electronic still photography is provided, where the camera prevents an increase in power consumption and facilitates displaying an image regardless of ambient light level.

These and other objects and features of the present invention will be better understood from the following description of the preferred embodiments.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Preferred embodiments of the present invention will be described below with reference to the accompanying drawings.

(First Embodiment)

Figure 1A:
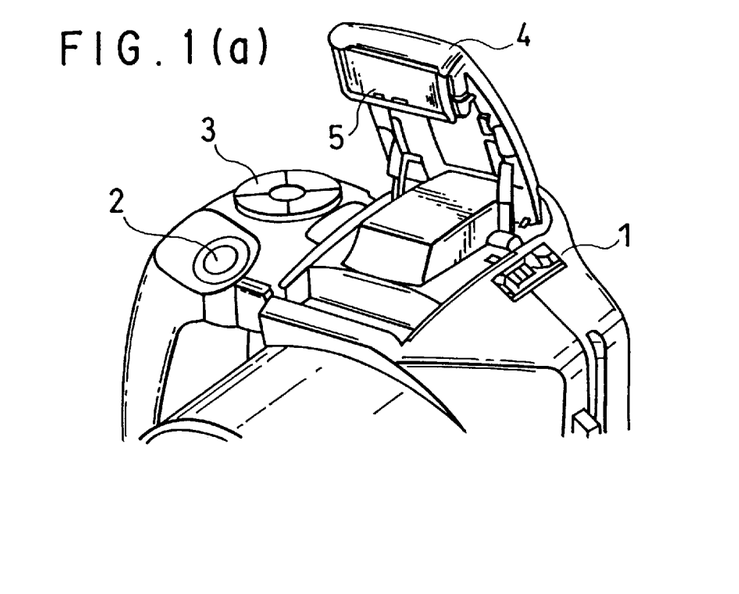
FIGS. 1(a) and 1(b) respectively illustrate a front perspective view and a rear perspective view of a camera according to the first embodiment of the present invention.
Figure 1B:
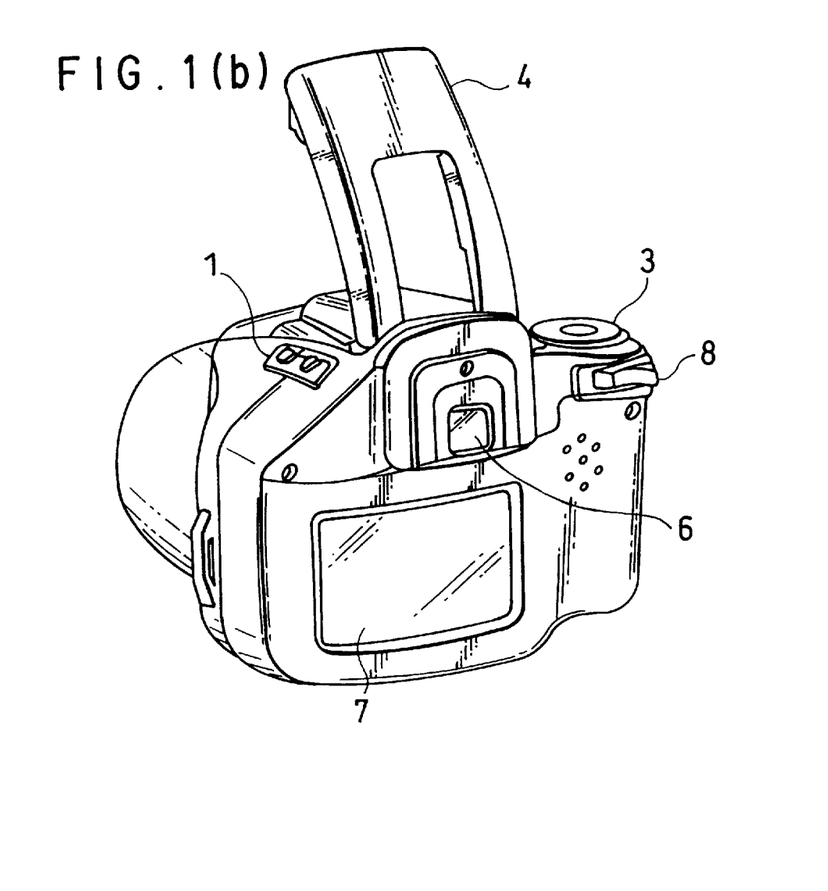

FIGS. 1(a) and 1(b) respectively illustrate a front perspective view and a rear perspective view of a camera according to a first embodiment of the present invention. The first embodiment is embodied as a so-called single lens reflex (SLR) camera. In FIG. 1(a), a power switch 1 for switching power of the camera is provided on the top right side of the camera. A release button 2 for directing commencement of exposure operations of a silver-salt film exposure device for exposing an object image on a silver-salt film and an electronic image device, including an imager for converting an object image into an electronic signal, and an exposure mode button 3 for designating any one of the exposure modes are provided on the top left side of the camera. A flash unit 4 pops up mechanically in response to turning on the power switch 1. A flash panel 5 for passing through flash light is located in a front face of the flash unit. A first release (1st Rel.) switch turns on while the release button 2 is depressed at half stroke of the button, and a second release (2nd Rel.) switch turns on while the button is fully depressed.

In FIG. 1(*b*), an eye piece 6 of an optical finder for observing an object image based on rays passed through a photo-taking lens, a monitor screen 7 for displaying an object image based on an image signal outputted from an imager device, and a zoom up-down button 8 for manually changing focal length of a zoom lens are respectively provided on a back face or side of the camera.

Turning on the power switch 1 powers functional blocks of the camera and the flash unit 4 pops up. A suitable photographic composition is decided by observing the eye piece 6 of the optical finder, where the focal length of the photo-taking lens can be varied by operating the zoom in-out button 8. After a photographer decides upon a suitable photographic composition, the release button 2 is depressed to begin a picture taking sequence which is described later. The object image is not only exposed on the silver-salt film but also converted to the image signal by the imager device to be displayed on the monitor screen 7. If the object image displayed on the monitor screen is not conformed to a motivation, then another photograph can be taken again at once.

Figure 2:
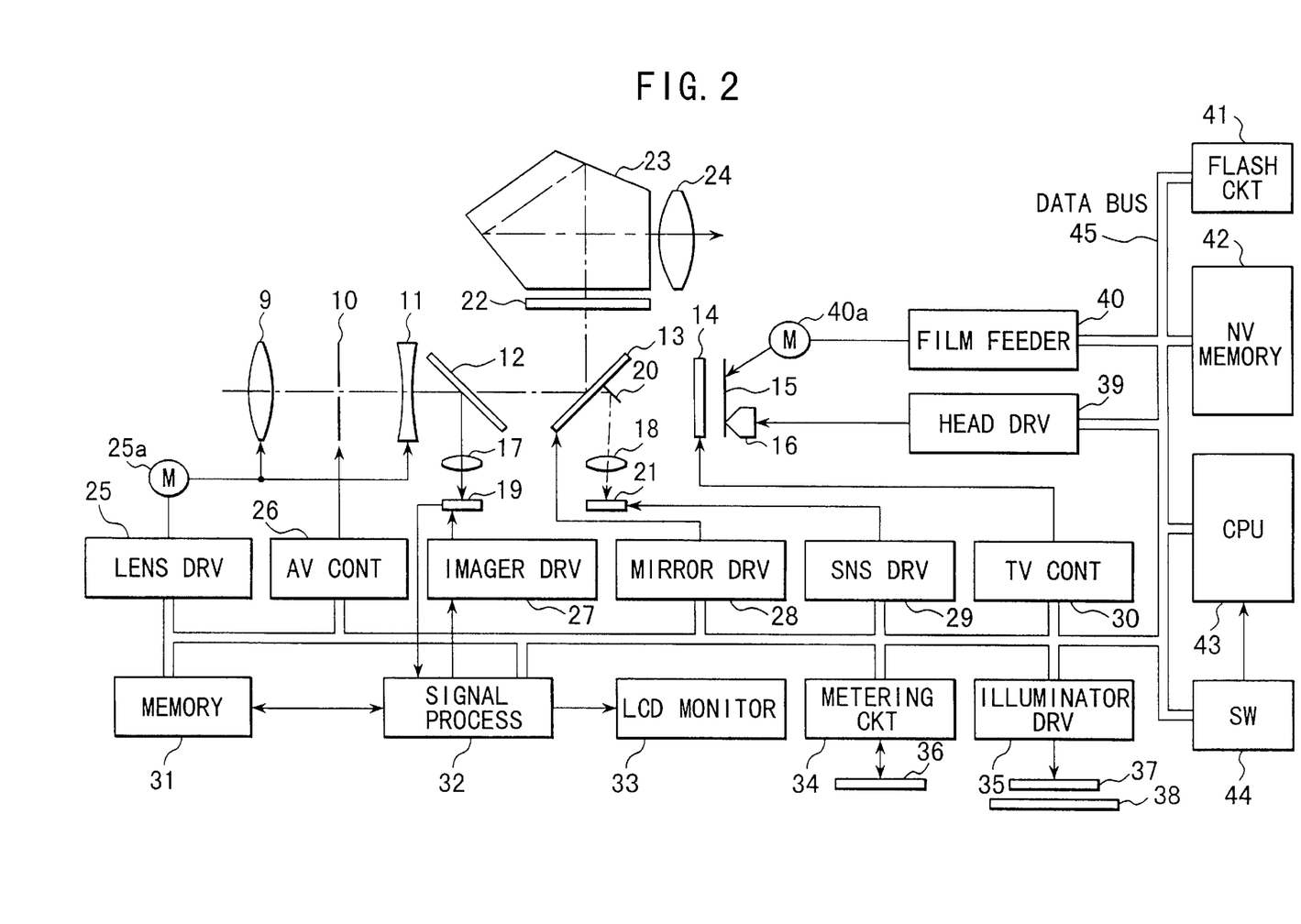
FIG. 2 illustrates a schematic diagram of the camera shown in FIG. 1.

FIG. 2 illustrates a schematic diagram of the camera shown in FIG. 1. The photo-taking lens for focusing the object image includes at least a convex lens 9, a concave lens 11, and an aperture diaphragm 10. The aperture diaphragm 10 is driven by an aperture control circuit (AV cont) 26. A half mirror 12 is provided backward of the concave lens 11. A part of incident light passed through the photo-taking lens reflected by the half mirror 12 is focused on an area sensor 19, which is one of the electronic imagers, via a focus lens system 17.

The area sensor 19 driven by a driver circuit (imager drv) 27 converts an object image received thereon into an analogue image signal and outputs the image signal to a signal process circuit 32. The signal process circuit 32 controls the driver circuit (imager drv) 27 with outputting a sync signal and performs a predetermined signal process including the conversion of the analogue signal into a digital signal. The signal process circuit 32 is also connected to a volatile memory 31, monitor means 33 including a reflective type color LCD panel which displays a image by utilizing ambient light, and a data bus 45. A non-volatile memory 42 is connected to the data bus 45. Detailed structure of the monitor means is described below.

The signal process circuit 32 transfers processed signal to the volatile memory 31 and the non-volatile memory 42 as an electronic image. The electronic image stored in the volatile memory 31 is displayed on an LCD monitor 33 which includes the monitor screen 7 (FIG. 1(*b*)). The non-volatile memory 42 is detachable from (or may be fixed to) the camera body. The non-volatile memory 42 is used for storing the electronic image, because it can be electrically rewritable and able to hold the image without applying any power source. The analogue image signal from the area sensor 19 is inputted to the signal process circuit 32 in order to calculate luminance of the object, and after signal conversion is transferred to a central processing unit (CPU) 43 via the data bus 45.

A light sensor 36 is provided in the vicinity of the LCD monitor 33, which is possibly located in the exterior of the camera body, and measures intensity of incident light to the LCD monitor 33. The light sensor 36 is controlled by a metering circuit 34. Measured intensity of incident light is transferred to the CPU 43 via the metering circuit 34. The light sensor 36 and the metering circuit 34 are included in luminance measuring means.

An illuminator drive circuit 35 drives an illuminator 37. The illuminator 37 illuminates the LCD monitor 33 by emitting light based on the control of the illuminator drive circuit 35. A diffuser 38 for diffusing emitted light within a face of the LCD monitor 33 is provided in the vicinity of the illuminator 37. The illuminator drive circuit 35, the illuminator 37, and the diffuser 38 are included in illumination means for illuminating the LCD monitor 33.

Beyond half mirror 12 is a swing mirror 13, which has a half mirrored portion in the center thereof and which is followed by a sub-mirror 20 for reflecting incident object light in a downward direction. In an optical path of the reflected light of the sub-mirror 20, there is a well-known separator optical system for separating object light into a pair of lights. A line sensor 21 located at a focal point of the separator optical system 18 is connected to a sensor drive circuit (sns drv) 29. A well-known phase difference type focus detection device is constructed by the sub-mirror 20, the separator optical system 18, the line sensor 21, and so forth. The CPU 43 calculates spacing of the pair of object images formed on the line sensor 21 based on inputted signal via the sensor drive circuit 29 and lens drive amount for focusing the photo-taking lens to the object.

Each of the photo-taking lens 9 and 11 is driven by a lens drive circuit (lens drv) 25 for driving a focus/zoom motor 25*a*. In the lens drive circuit 25, there is provided an encoder, which is not shown, for generating a signal in response to movement of each of the lens 9 and 11. The CPU 43 controls the focusing operation based on the output of the encoder and the calculated lens drive amount described above.

In a reflection optical path of the swing mirror 13, a focusing screen 22, a pentagonal roof prism 23, and an eye piece 24 are provided to form an optical view finder. As the camera according to this embodiment has an optical view finder in addition to the LCD monitor for monitoring an object image, the camera may be operated with observing the view finder instead of the LCD monitor, so that the camera is held steadily and advantageous to prevent camera blur.

The swing mirror 13 is driven by a mirror drive circuit (mirror drv) 28, and a shutter 14 located behind the swing mirror 13 is driven by a shutter drive circuit (TV cont) 30. A silver-salt film 15 is exposed when the swing mirror 13 swings up and the shutter 14 opens. The CPU 43 calculates an aperture value of the aperture diaphragm 10 and shutter speed of the shutter 14, which give a proper exposure amount for the film 15 based on luminance of the object outputted from the signal process circuit 32 and film speed detected by a film speed detection circuit which is not shown. The shutter 14 is driven at the calculated speed.

The silver-salt film 15 has a magnetic recording track thereon, and a magnetic head 16 is provided so as to contact the magnetic track on the film. The magnetic head which has functions for both writing and reading is driven by a head drive circuit 39.

Film feeder 40, inside of the camera, controls film feed operation including film initial wind, wind one frame after exposure, and film rewind by controlling a feed motor 40*a*. The magnetic data recording is performed while the film is fed.

Flash circuit (flash CKT) 41 causes a flash as an auxiliary light source on photo-taking while the CPU determines that ambient light intensity is less than a predetermined level. Switches 44 include a plurality of switches such as an operation switch, operation detect switches of each of the mechanisms, and so forth; those switches 44 are connected to the CPU 43.

The data bus 45 is commonly connected among the signal process circuit 32, the flash circuit 41, the non-volatile memory 42, the volatile memory 31, the CPU 43, the switches 44, the head drive circuit 39, the film feeder 40, the shutter drive circuit 30, the line sensor drive circuit 29, the mirror drive circuit 28, the aperture control circuit 26, the lens drive circuit 25, the light sensor drive circuit 34, and the illuminator drive circuit 35. The CPU controls those circuits via the data bus 45.

Figure 3A:
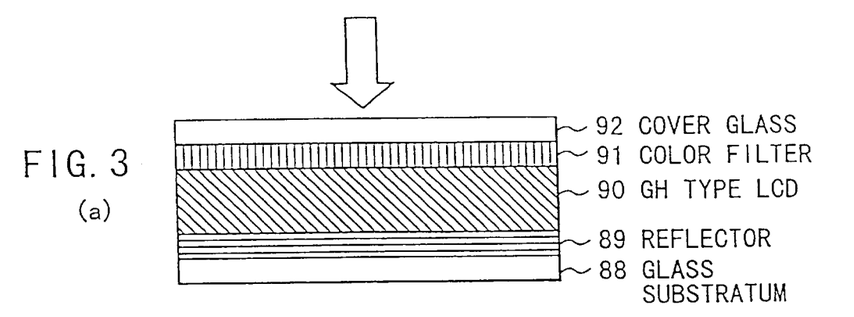
FIGS. 3(a)–(c) respectively illustrate cross sections showing monitor display panels 33 used in the camera.
Figure 3B:
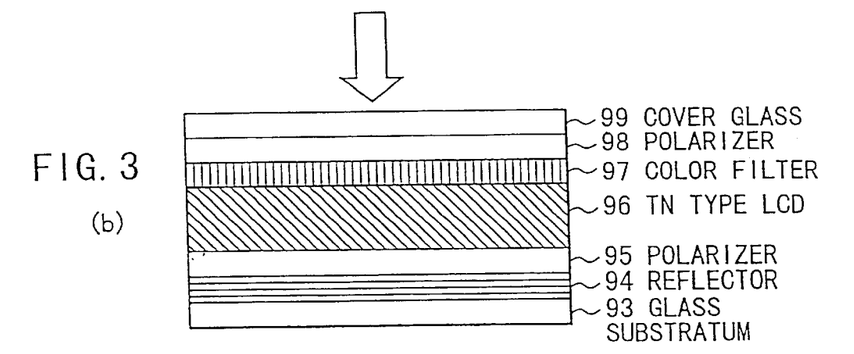

FIGS. 3(a) and 3(b) respectively illustrate cross sections showing reflective type LCD display panels in monitor 33 as used in the camera. FIG. 3(a) shows a GH (guest-host) type LCD panel which includes dyestuffs as a guest and liquid crystal as a host, the orientation of the dyestuff molecular is controlled to vary the transmission factor by applying an alternate electric field. In the GH type LCD panel, the GH type LCD layer 90 is enclosed between a reflector 89 glued onto a glass substratum 88 and a color filter 91 glued onto a cover glass 92. An incident light shown with an arrow is split into rays of three primary colors (red, green, and blue) due to the color filter 91. The three primary color rays are modulated as to each of their transmission factors by affection of the GH type LCD layer 90. Those rays are then reflected and scattered on the reflector 89. Rays reflected by the reflector 89 return to the outside of the LCD panel.

FIG. 3(b) shows a TN (twisted nematic) type LCD panel which controls transmission factors of rays of three primary colors to modulate the molecular orientation by applying an alternate electric field. In the TN type LCD panel, a TN type LCD layer is sandwiched between a color filter 97 glued onto an upper polarizer 98 which is glued onto a cover glass 99 and a lower polarizer 95 glued onto a reflector 94 which is glued onto a glass substratum 93. The upper polarizer 98 and the lower polarizer 95 form a so-called crossed nicol. An incident light shown with an arrow is split into rays of three primary colors (red, green, and blue) due to the color filter 97. The three primary color rays are modulated as to each of their transmission factors by affection of the TN type LCD layer 96. Those rays are then reflected on the reflector 94. Rays reflected by the reflector 94 return to the outside of the LCD panel.

Figure 3C:
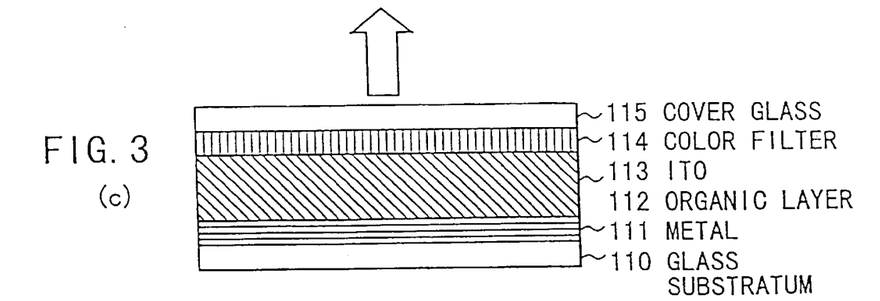

FIG. 3(c) shows an organic type electronic-luminescent (OEL) panel which is one of a color light emission device. In the OEL panel, an organic blue light source layer 112 is sandwiched between a cathode metal 111 glued on a glass substratum 110 and an anode ITO 113 glued on a color filter 114. The color filter 114 is glued on a cover glass 115, and the cathode metal 111 has a low work function. The organic blue light source layer 112 has a thin laminated structure. A blue light generated in the organic layer 112 is modulated by the color filter 114 to be converted into three primary colors (red, green, and blue). As the OEL panel is a light emission type color display panel, the back light or the front light is not required to display images.

Figure 4A:
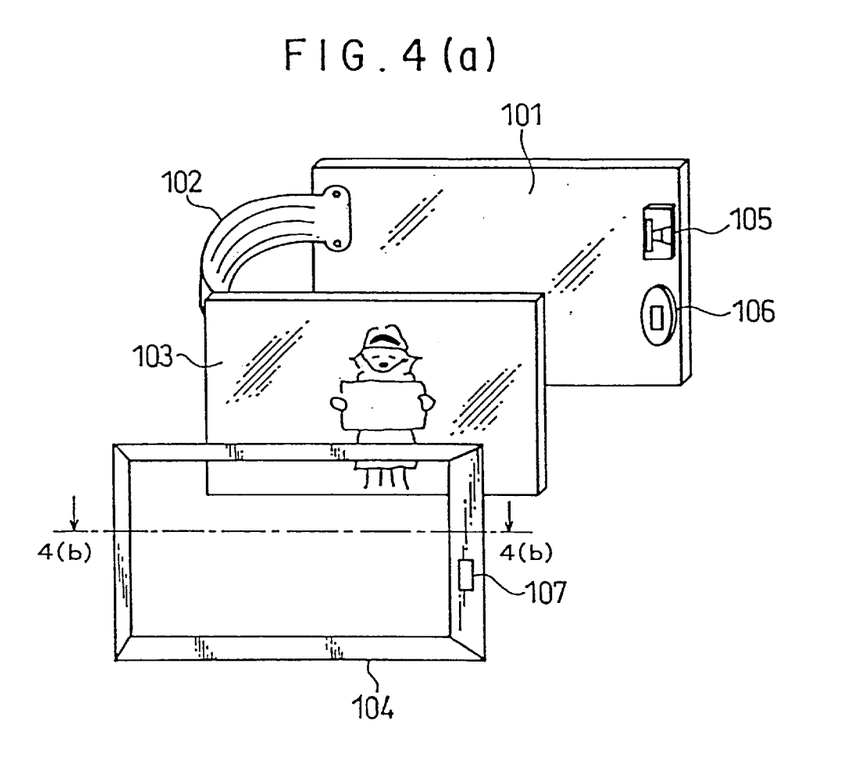
FIG. 4(a) illustrates a structure of a monitor device of the camera.
Figure 4B:
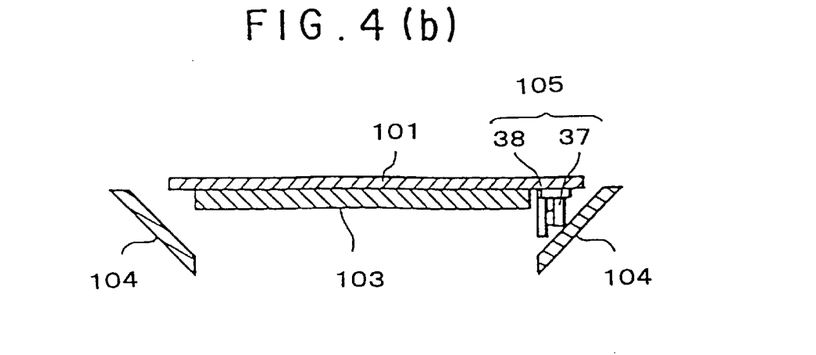
FIG. 4(b) is cross-sectional view taken along the line 4(b)–4(b) in FIG. 4(a)

FIGS. 4(a) and FIG. 4(b) respectively illustrate structure of the monitor device of the camera. FIG. 4(a) shows an exploded perspective view of the monitor device, and FIG. 4(b) shows a cross-section taken along line 4(b)–4(b) in FIG. 4(a). As shown in FIG. 4(a), a circuit board 101 on which various electronic parts are mounted is attached to the main body of the camera. A connection cable or flexible printed circuit board 102 is connected between the main circuit board 101 and a display panel 103. The display panel 103 is attached to the main body of the camera by a fixing frame 104. There are provided on the circuit board 101 a front light 105 (including the illuminator 37 and the diffuser 38 shown in FIG. 2) for illuminating a face of the display panel 103 and a light sensor 106 which corresponds to the light sensor 36 in FIG. 2. The fixing frame 104 has an opening for the light sensor 106. The front light 105 is located behind the fixing frame 104 as shown in FIG. 4(b).

Figure 5:
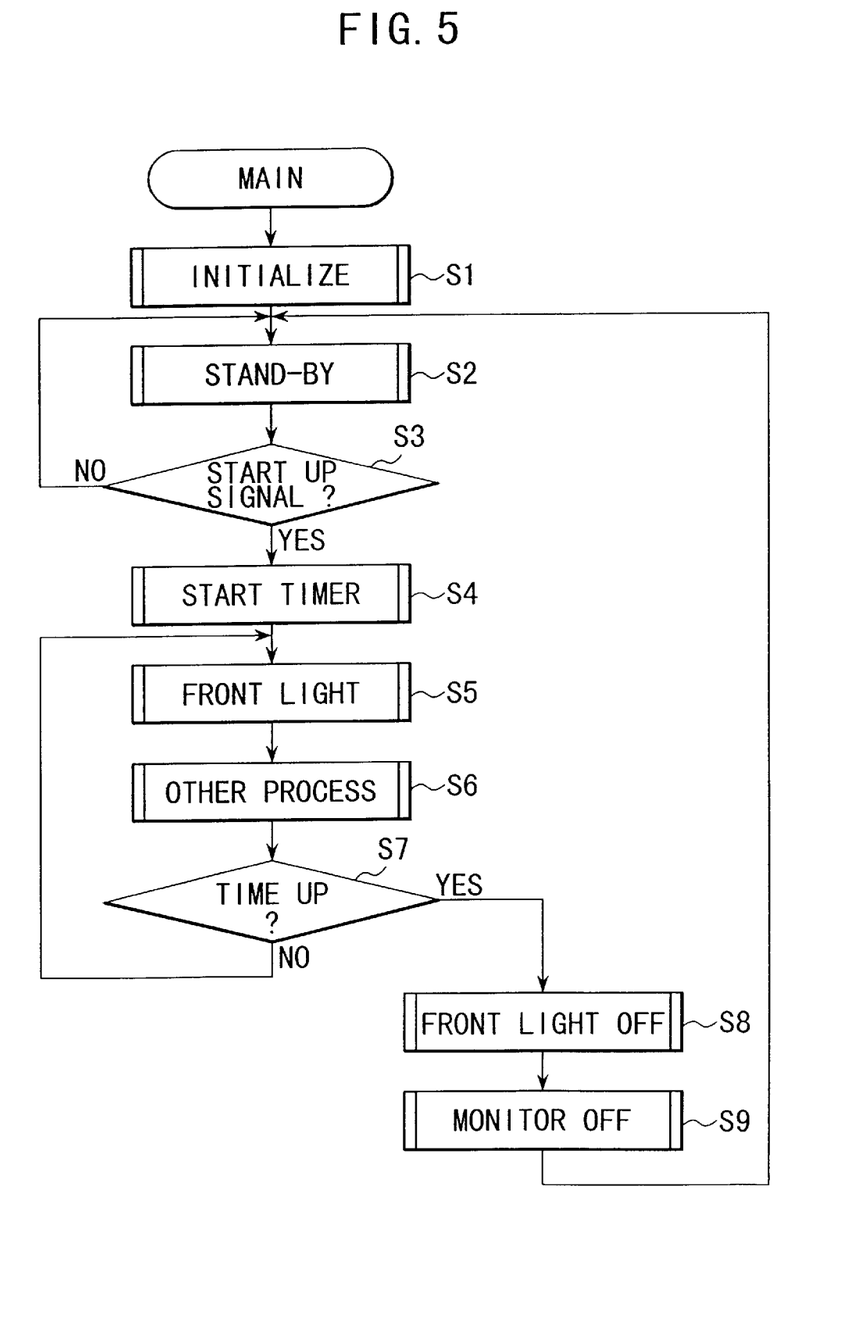
FIGS. 5–7 illustrate flowcharts of a CPU of the camera shown in FIG. 1.
Figure 6:
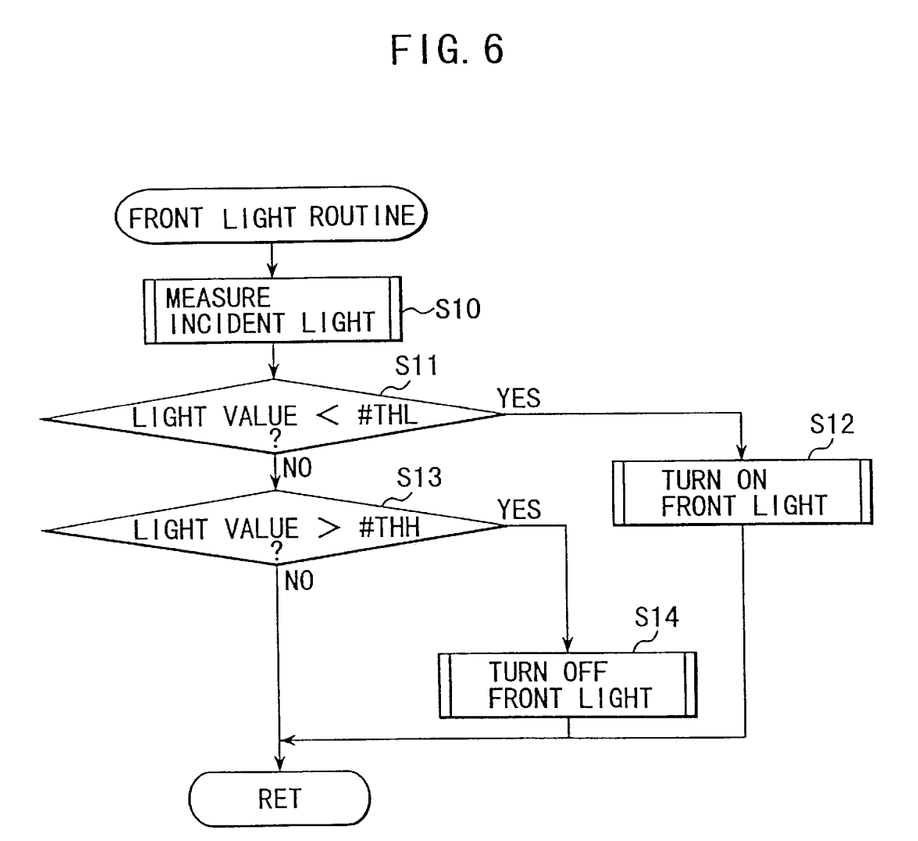
Figure 7:
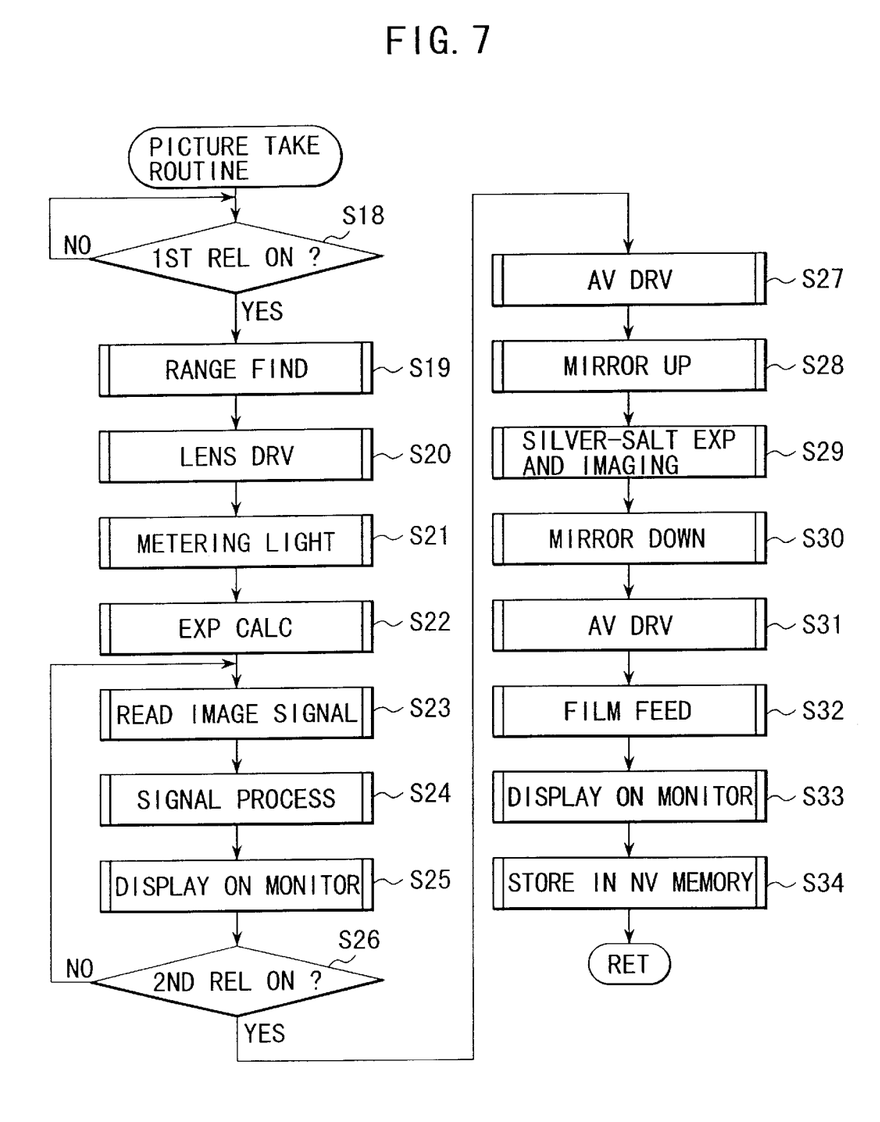

The operation of the camera is described below with reference to FIGS. 5–7. FIG. 5 is a flow chart showing a main routine of the CPU 43 with regard to the monitor display. FIGS. 6, 7 are flow charts respectively showing a front light routine and a picture take routine both included in the main routine.

In FIG. 5, on loading a battery to the camera, the CPU 43 begins operation from an initialize step S1. The initialize step S1 includes initializing both of a program counter and a random access memory (RAM) provided inside of the CPU 43. The CPU 43 falls into a stand-by mode where further program execution stops (S2). Once any one of the switches including the release switch and the mode set switch is operated, a start signal is generated and the CPU 43 returns to the main routine from the stand-by mode. The start signal is judged if it is a valid signal (S3). If the start signal is valid, then the flow proceed to step S4; otherwise the flow returns to the step S2 and falls into the stand-by mode again.

A timer in the CPU 43 begins counting (S4), the timer counts a predetermined time. If no camera operation is applied within the predetermined time, then the CPU 43 falls into the stand-by mode to minimize power consumption. In steps S5 and S6, a front light routine and a picture take routine, which are described below, are carried out, respectively.

The CPU 43 judges if the timer, started at the step S4, has counted up the predetermined time. If the CPU 43 determines that the timer has counted up the predetermined time (S7), then the front light 105 is turned off (S8) and the LCD monitor 33 is also turned off (S9). After step S9, the flow returns to the step S2. On the other hand, if the CPU 43 does not determine that the timer has counted up the predetermined time, then the flow returns to the step S5.

The front light routine is now described with reference to FIG. 6. In this routine, intensity of incident light to the face of the display panel 103 is measured, and the front light 105 is switched either on or off based on the measurement. At first, intensity of incident light to the face of the display panel 103 is measured by the light sensor 106 (S10). If the measurement of the light sensor 106 is less than #THL as a first predetermined value (S11), then the front light is turned on (S12) and the flow returns to the main routine. On the other hand, if the measurement of the light sensor 106 is determined to be not less than #THL, then the measurement is compared with #THH as a second predetermined value (S13). If the measurement is greater than #THH, then the front light is turned off (S14) and the flow returns to the main routine. On the other hand, if the measurement is less than #THH in the step S13, then the flow returns to the main routine. In the mean while, #THH is set to be greater than #THL to make a dead zone. This dead zone prevents the front light 105 from flickering within the light range between #THL and #THH.

The picture-take routine is now described with reference to FIG. 7. This routine is included in the other process (S6)

shown in FIG. 5. In step S18, the CPU 43 reads a signal from the 1st release switch which is activated by a half depression of the release button 2 shown in FIG. 1(a). If the 1st release switch is determined to be on (S18), then range find and focusing drive are respectively executed (S19, 20). In the step S19, the CPU 43 detects relative distance between the pair of object images based on the output of the line sensor 21, calculates lens drive amount for focusing the object, and drives the photo-taking lens based on the calculated amount. The CPU 43 also calculates actual distance to the object based on numbers of encoder pulse signals counted from an original position of the photo-taking lens.

Luminance of the object is measured based on the output of the area sensor 19 (S21). A proper shutter speed and aperture value to give a proper exposure for the silver-salt film 15 and proper exposure time for the area sensor 19 are calculated based on the luminance of the object which is given in step S21 and a film speed detected by a film speed sensing circuit which is not shown.

The image signal from the area sensor 19 is read by the signal process circuit 32 (S23), and is executed to the predetermined signal process (S24). The image of the object is displayed on the monitor screen 33 based on the processed signal (S25).

In the step S26, the CPU 43 reads a signal from the 2nd release switch which is activated by fully depressing the release button 2 shown in FIG. 1(a). If the 2nd release switch is determined to be on (S26), then the flow proceed to step S27; otherwise the flow returns to step S23. The CPU 43 sets the aperture diaphragm 10 at a step calculated in the step S22 (S27), and makes the swing mirror 13 swing up to withdraw from an optical axis of the photo-taking lens (S28). The CPU 43 controls the shutter 14 at a shutter speed calculated in step S22 to expose the silver-salt film 15, and reads an image signal from the area sensor 19 based on the exposure time calculated in step S22 (S29). The image signal is processed in the signal process circuit 32 to be converted into digital image data and is stored in the volatile memory 31. After exposing the silver-salt film 15 and signal process of the image signal, the CPU 43 makes the swing mirror 13 swing down to return to the previous position (S30).

The CPU 43 sets the aperture diaphragm 10 at an initial position (usually full aperture position) (S31), controls the feed motor 40a to wind up a frame of the silver-salt film 15 (S32), and controls the LCD monitor 33 to display the digital image data (S33). The CPU 43 transfers the digital image data stored in the volatile memory 31 to the non-volatile memory 42 and returns to the main routine (S34).

In the picture-take routine, controls of the aperture diaphragm (S31), film wind up (S32) and display on the monitor (S33) are sequentially activated. However, these controls may be actuated at a time in order to shorten the picture take interval. Even in such a case, power consumption is minimized, since the monitor display is the reflective type display device which utilizes the ambient light.

As the camera utilizes the reflective type monitor display, the image displayed on the monitor is easily observed even under daylight compared with a combination of a permeation type LCD panel and a back light. Since the camera controls the front light 105 based on ambient light level detected, the camera allows easy operation, as well as giving bright image even in a dark condition. The camera also controls the front light 105 to turn off while ambient light level is greater than a predetermined level, so that power consumption is minimized.

As the camera utilizes the reflective type monitor display, the back light for illuminating the permeation type LCD panel regardless of ambient light level is not essentially required, so that the camera can greatly reduce power consumption.

Additionally, the OEL panel shown in FIG. 3(c) may be used instead of the LCD panels shown in FIGS. 3(a) and 3(b).

(Second Embodiment)

Figure 8A:
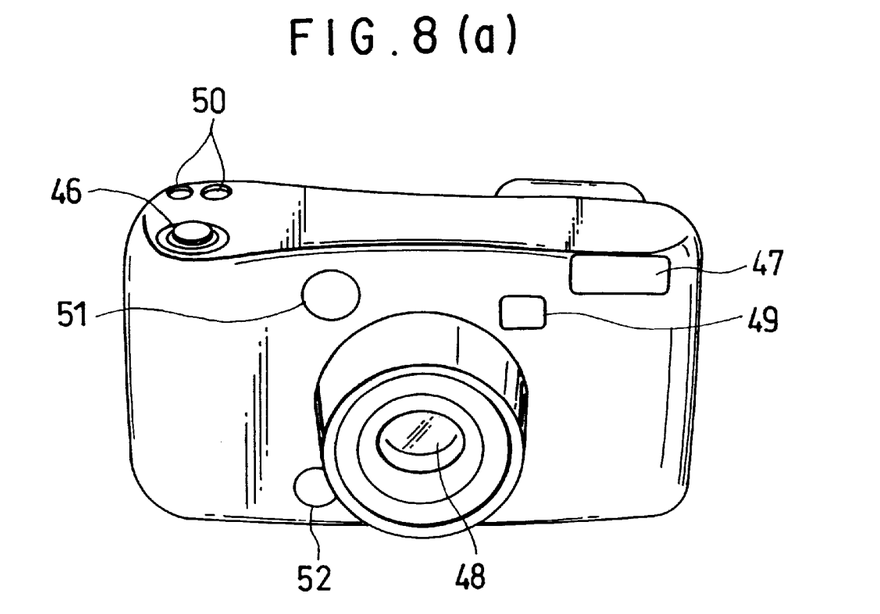
FIGS. 8(a) and 8(b) respectively illustrate a front perspective view and a rear perspective view of a camera according to the second embodiment of the present invention.
Figure 8B:
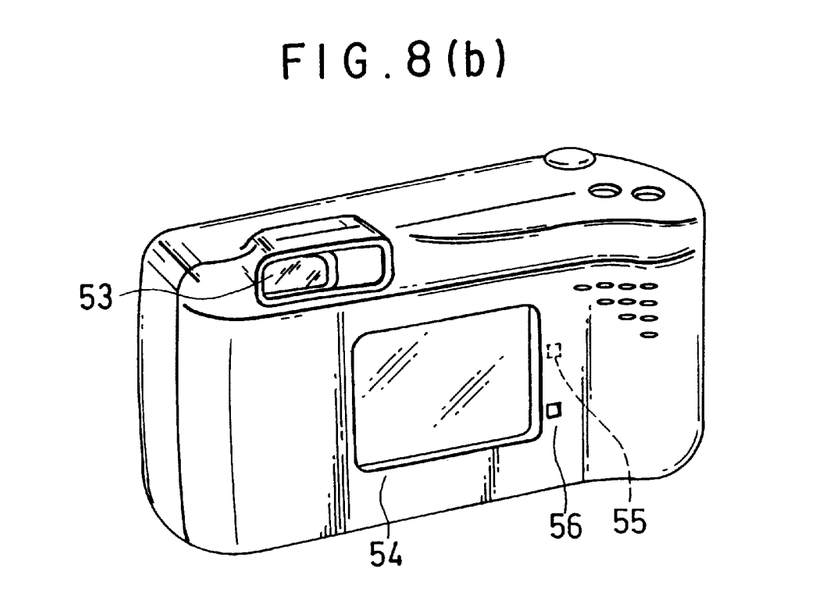

FIGS. 8(a) and 8(b) respectively illustrate a front perspective view and a rear perspective view of a camera according to the second embodiment of the present invention. In FIG. 8(a), there are provided, in a front face of the camera, a two stroke release button 46, a flash window 47, photo-taking lens 48 for silver-salt film, finder window 49, and a zoom up/down button 50 for varying focal distance of the photo-taking lens 48. The distance to the object is measured by a so-called infra red active type autofocus unit, so there are also provided a light projection window 51 and a light receiving window 52 in the front face of the camera.

In FIG. 8(b), there are provided, in a rear face of the camera, a finder eye piece 53, a monitor display 54, and a manual operation switch (FL SW) 56 for turning on/off a front light 55 located on a side of the monitor display 54.

A finder view of the camera varies in response to varying focal length of the photo-taking lens 48. The finder view which has the same view angle as the photo-taking lens 48 is observed in the finder eye piece 53. An area sensor 65, which is described below, is provided in the finder optical system of the camera, and the monitor display 54 displays an object image based on image signal outputted from the area sensor 65.

Figure 9:
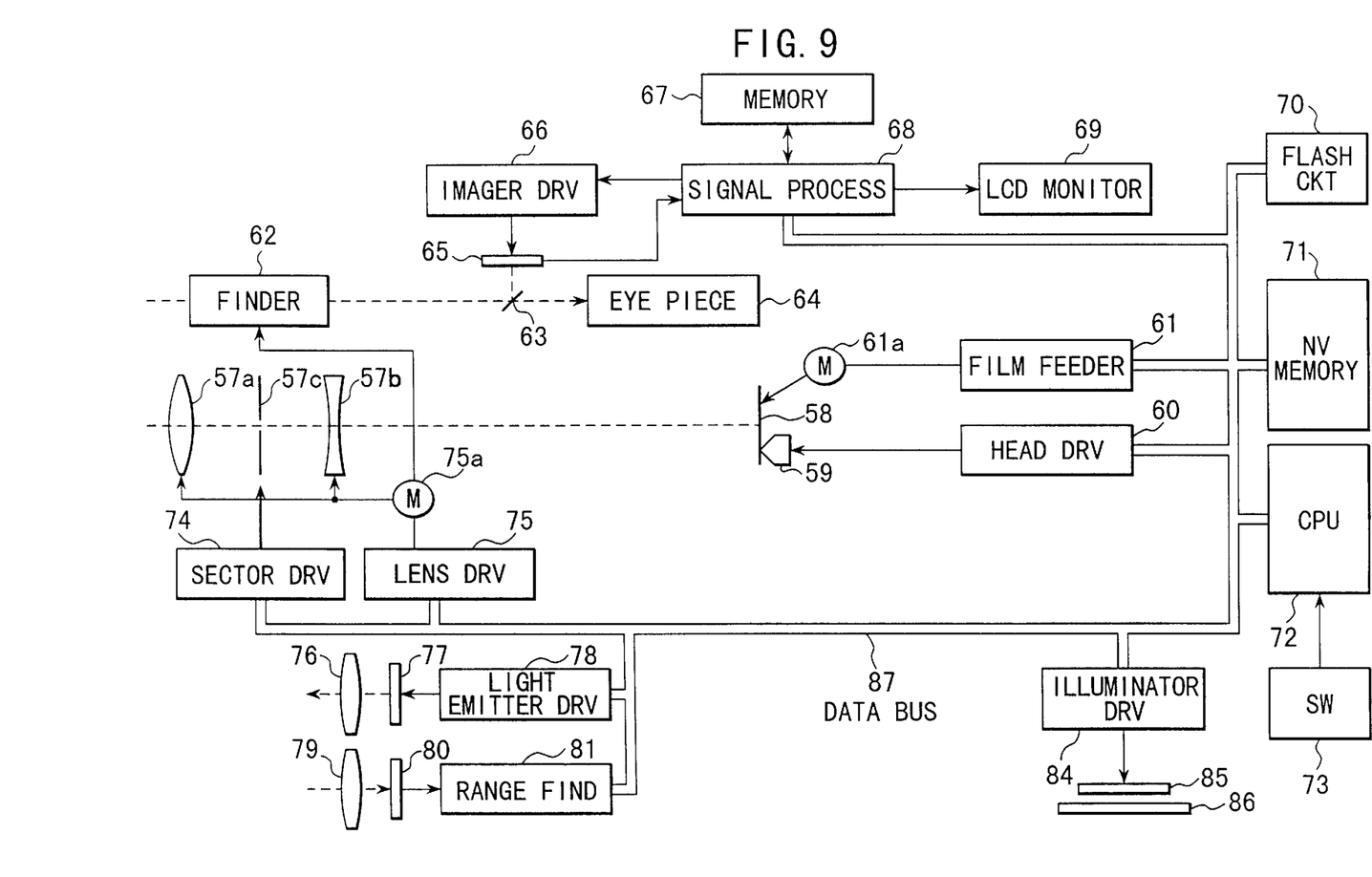
FIG. 9 illustrates a schematic diagram of the camera shown in FIGS. 8(a) and 8(b)

FIG. 9 illustrates a schematic diagram of the camera shown in FIGS. 8(a) and 8(b). The photo-taking lens includes at least a convex lens 57a, a concave lens 57b, and a lens shutter mechanism 57c located between the lenses. The lens shutter mechanism 57c includes movable sectors therein and is driven by a sector drive circuit 74. The lenses 57a and 57b are driven by a lens drive circuit 75 via a focus/zoom motor 75a.

An infra red ray generated by a light emitter 77 and projected through the projection lens 76 reflects on the object. The reflected ray returns via a receiving lens 79 to a PSD (position sensitive device) 80. This autofocus unit is a well-known active autofocus system, which measures distance to the object by the principle of triangulation. The light emitter 77 is driven by a light emitter drive circuit (light emitter drv) 78, and output signal of the PSD 80 is converted to a digital signal as distance information in the range find circuit 81. The CPU 72 calculates the lens drive amount based on the distance information.

The camera has a finder optical system 62 provided independent of the photo-taking optical system. The finder optical system 62 varies its view angle in synchronism with the lens 57a and 57b driven by the motor 75a. A part of the incident ray passed through the finder window 49 proceeds to finder eye piece 64 via the finder optical system 62 and a half mirror 63, such that an object image is observed in the eye piece 64. The rest of the incident ray reaches an area sensor 65 as an electronic imager device.

The area sensor 65 is driven by an imager drive circuit (imager drv) 66, which converts object image to an analogue signal and outputs to a signal process circuit 68. The signal process circuit 68 outputs a sync signal to the imager drive circuit 66 and executes a predetermined process including signal conversion from analogue signal to digital signal. The signal process circuit 68 is connected to a volatile memory 67, the LCD monitor 69, and a data bus 87.

The signal process circuit 68 transfers the processed signal to the volatile memory 67. The processed signal stored in the volatile memory 67 is displayed on the LCD monitor 69. The processed signal outputted from the signal process circuit 68 is available for use with light metering information for calculating the proper exposure by applying a further process.

An illuminator 85 for illuminating the display face of the LCD monitor 69 is driven by an illuminator drive circuit 84. A diffuser 86 is provided in the direction of irradiation of the illuminator 85 in order to diffuse light uniformly. The illuminator drive circuit 84, the illuminator 85, and the diffuser 86 are included in illuminating means for illuminating the face of the LCD monitor.

A silver-salt film 58 is exposed when the shutter 57*c* is driven to open by the sector drive circuit 74. The CPU 72 calculates the proper shutter opening time based on an output of the signal process circuit 68 and film speed detected by a film speed detect circuit (which is not shown), and the shutter 57*c* opens during the calculated time.

A magnetic recording track is provided on the silver-salt film 58, and a magnetic head 59 is provided so as to contact the track. The magnetic head 59 is driven by a head drive circuit 60 to record various information on the track.

A film feeder circuit 61 is provided inside of the camera. The film feeder 61 controls the film feed operation, including film initial wind, wind one frame after exposure, and film rewind, by controlling a feed motor 61*a*. The magnetic data recording is performed while the film is fed.

A flash circuit (flash CKT) 70 provides flash as an auxiliary light source on photo-taking when the CPU determines that ambient light intensity is less than a predetermined level. Switches 73 include a plurality of switches such as the FLSW, operation detect switches of each mechanisms, and so forth; those switches 73 are connected to the CPU72.

The data bus 87 is commonly connected among the signal process circuit 68, the flash circuit 70, the non-volatile memory 71, the CPU 72, the head drive circuit 60, the film feeder circuit 61, the sector drive circuit 74, the lens drive circuit 75, the light emitter drive circuit 78, the range find circuit 81, and the illuminator drive circuit 84; the CPU controls those circuits via the data bus 87.

The structure of the LCD monitor 69 and the display panel thereof are fundamentally similar to that of the first embodiment shown in FIGS. 3 and 4. However, in this second embodiment, the light sensor for measuring ambient light is missing since the FLSW is used as a front light control.

Figure 10:
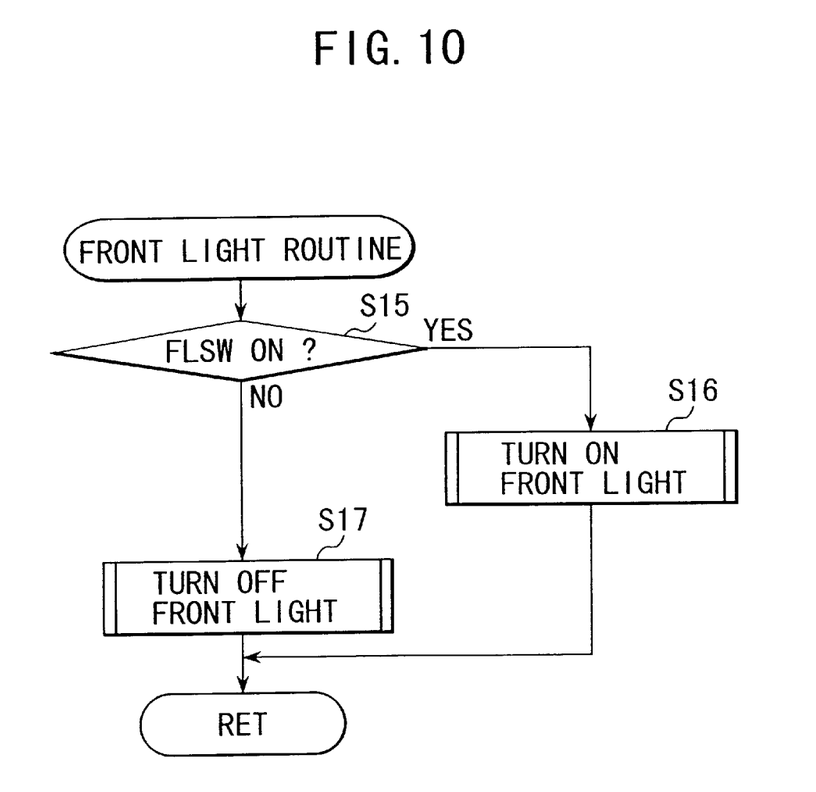
FIGS. 10–11 illustrate flowcharts of a CPU of the camera shown in FIG. 8.
Figure 11:
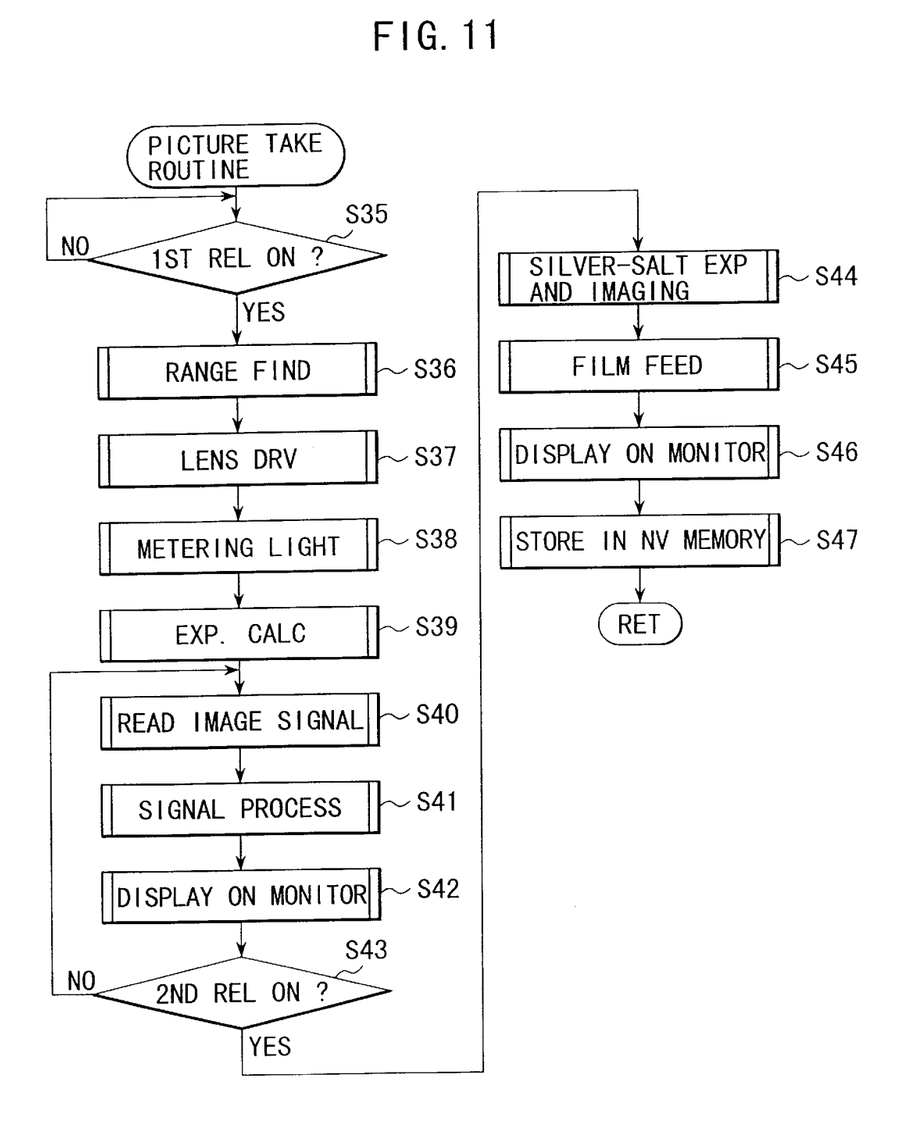

The operation of the camera is now described. As a flow chart of a main routine of the camera which features operations of the monitor display is similar to FIG. 5, the description for the main routine of the camera is omitted. FIGS. 10 and 11 are flow charts respectively showing a front light routine and a picture-take routine, both being included in the main routine.

In FIG. 10, the CPU 72 reads a signal from the FLSW 56 (S15). If the FLSW 56 is determined to be on, then the CPU 72 turns the front light 55 on (S16); otherwise it turns the front light 55 off (S17) and the flow returns to the main routine.

In FIG. 11, the CPU 72 reads a signal from the 1st release switch which is activated by a half depression of the release button 46 shown in FIG. 8(*a*) (S35). If the 1st release switch is determined to be on (S35), then range find and focusing drive are respectively executed (S36, 37). The CPU 72 executes well-known triangulation based on the output of the range find circuit 81 and calculates lens drive amount for focus adjustment (S36), and drive the photo-taking lens based on the calculated amount (S37).

Luminance of the object is measured based on the output of the area sensor 65 (S38). A proper sector opening time to give a proper exposure for the silver-salt film 58, and proper exposure time for the area sensor 65 are calculated based on the luminance of the object which is given in the step S38 and a film speed detected by a film speed sensing circuit which is not shown (S39).

The image signal from the area sensor 65 is read by the signal process circuit 68 (S40), and is executed by the predetermined signal process (S41). The image of the object is displayed on the monitor 69 based on the processed signal (S42).

In the step S43, the CPU 72 reads a signal from the 2nd release switch which is activated by full depression of the release button 46 shown in FIG. 8(*a*). If the 2nd release switch is determined to be on (S43), then the flow proceeds to step S44; otherwise, it returns to the step S40. The CPU 43 controls the shutter sector 57*c* at a shutter speed calculated in the step S39 to expose the silver-salt film 58, and reads image signal from the area sensor 65 based on the exposure time calculated in the step S39 (S44). The image signal is processed in the signal process circuit 68 to be converted into digital image data, and is stored in the volatile memory 67. After exposing the silver-salt film 58 and signal process of the image signal, the CPU 72 winds the silver-salt film 58 up by controlling the feed motor 61*a* (S45), and displays the processed image signal on the monitor display 69. The CPU 72 transfers the digital image data stored in the volatile memory 67 to the non-volatile memory 71 and returns to the main routine (S47).

In the picture-take routine, controls of the film wind up (S45) and display on the monitor (S46) are sequentially activated. However, these controls may be actuated at the same time in order to shorten the picture-take interval. Even in such a case, power consumption of the camera is minimized since the monitor display is the reflective type display device which utilizes the ambient light.

Additionally, since the front light 55 is controlled by the FLSW which is manually operated, the light sensor and the metering circuit which have been shown in the first embodiment are not required in the second embodiment.

The above described preferred embodiments are intended to illustrate the principles of the invention, but not to limit the scope of the invention. Various other embodiments and modifications to these preferred embodiments may be made by those skilled in the art, without departing from the scope of the following claims.

What is claimed is:

1. A camera for both silver-salt film photographing and electronic still photographing, comprising:

an electronic still photographing unit including an imaging device for converting an object image to an electronic signal;

a monitor display which displays the object image based on the electronic signal outputted from the electronic still photographic unit; and a silver-salt film photographing unit which exposes the object image on a silver-salt film, light intensity measurement means for measuring intensity of ambient light;

an illuminator which illuminates a face of the monitor display; and a controller which determines the operation of the illuminator in response to an output signal of the intensity measurement means, wherein the monitor display is a display panel for displaying an image by utilizing ambient light thereof.

2. The camera according to claim 1, wherein the monitor display is a reflective type color liquid crystal display panel.

3. A camera for both silver-salt film photographing and electronic still photographing, comprising:

an electronic still photographing unit including an imaging device for converting an object image to an electronic signal;

a monitor display which displays the object image based on the electronic signal outputted from the electronic still photographing unit; and a silver-salt film photographing unit which exposes the object image on a silver-salt film, wherein the monitor display is a display panel for displaying an image by utilizing ambient light thereof, an illuminator which illuminates a face of the monitor display; and a manual switch, wherein the face of the monitor display is illuminated by the illuminator when the manual switch is operated.

4. A camera for both silver-salt film photographing and electronic still photographing, comprising:

an electronic still photographing unit including an imaging device for converting an object image to an electronic signal;

a monitor display which displays the object image based on the electronic signal outputted from the electronic still photographing unit; and a silver-salt film photographing unit which exposes the object image on a silver-salt film, wherein the monitor display is a display panel for displaying an image by utilizing ambient light thereof, and wherein the monitor display includes a reflector for reflecting ambient light.

5. A camera for both silver-salt film photographing and electronic still photographing, comprising:

an electronic still photographing unit including an imaging device for converting an object image to an image signal;

monitor means having a face for displaying an image based on said image signal;

store means for storing the image signal;

a silver-salt film photographing unit which exposes the object image on a silver-salt film, light intensity measurement means for measuring intensity of incident light to a face of the monitor display;

comparison means for comparing an output signal outputted from the light intensity measurement means with a predetermined value;

an illuminator for illuminating said face of the monitor means; and means for determining the operation of the illuminator in response to an output signal of the comparison means, wherein the monitor display is a reflective type color liquid crystal display panel.

6. The camera according to claim 5, wherein the reflective type color liquid crystal display panel is one of a GH (guest-host) type and a TN (twisted nematic) type.

7. The camera according to claim 5, wherein the monitor means displays the object image based on an output of the electronic still photographing unit while the silver-salt film has been fed.

8. A camera for both silver-salt film photographing and electronic still photographing, comprising:

an electronic still photographing unit including an imaging device for converting an object image to an image signal;

monitor means for displaying an image based on said image signal;

a silver-salt film photographing unit which exposes the object image on a silver-salt film; and film feed means including a motor for feeding the silver-salt film, wherein said monitor means includes a reflector for reflecting an ambient light.

9. A camera for both silver-salt film photographing and electronic still photographing, comprising:

an electronic still photographing unit including an imaging device for converting an object image to an image signal;

monitor means having a face for displaying an image based on said image signal;

a silver-salt film photographing unit which exposes the object image on a silver-salt film;

an illuminator for illuminating said face of the monitor means; and determining means for determining operation of the illuminator.

10. The camera according to claim 9, further including light intensity measurement means for measuring intensity of incident light to a face of the monitor display, wherein the determining means responds to an output of the light intensity measurement means.

11. The camera according to claim 9, further including:

light intensity measurement means for measuring intensity of incident light to said face of the monitor means; and a controller which enables said illuminator to turn on while determined measured light intensity is less than a predetermined value, and which otherwise disables said illuminator.

12. The camera according to claim 9, further including:

light intensity measurement means for measuring intensity of incident light to said face of the monitor means; and a controller which enables the illuminator to turn on while determined measured light intensity is less than a first predetermined value, and which disables the illuminator while determined measured light intensity is greater than a second predetermined value, wherein the second predetermined value is greater than the first predetermined value.

13. The camera according to claim 9, wherein the determining means is a manual operation switch.

14. A camera for both silver-salt film photographing and electronic still photographing, comprising:

an electronic still photographing unit including an imaging device for converting an object image to an image signal;

monitor means having a face for displaying an image based on said image signal;

a silver-salt film photographing unit which exposes the object image on a silver-salt film;

an illuminator for illuminating said face of the monitor means; and control means for determining the operation of the illuminator, whereby said image displayed on the monitor means is easily observed regardless of ambient light intensity.

15. The camera according to claim 14, wherein the monitor means is a reflective type color liquid crystal display panel.

16. The camera according to claim 14, wherein the monitor means is located on a flat surface of an exterior member where the flat surface is in parallel with at least one of a film exposing mask and a film feed path of the silver-salt film photographing unit.

17. The camera according to claim 14, wherein the illuminator includes both a front light and a light guide provided in close vicinity of the display face of the monitor means.

18. The camera according to claim 14, wherein the monitor means begins to display the image when at least one of (A) photographing operation of the film photographing unit has been started and (B) when the film has been fed after exposure of the film has been finished.

* * * * *